(12) United States Patent
Berg

(10) Patent No.: US 8,541,515 B1
(45) Date of Patent: Sep. 24, 2013

(54) POLYMER COMPOSITIONS WITH IMPROVED SURFACE PROPERTIES

(75) Inventor: Daniel T. Berg, Elm Grove, WI (US)

(73) Assignee: Trillium Specialties, LLC, Whitewater, WI (US)

( * ) Notice: Subject to any disclaimer, the term of this patent is extended or adjusted under 35 U.S.C. 154(b) by 472 days.

(21) Appl. No.: 12/416,635

(22) Filed: Apr. 1, 2009

Related U.S. Application Data

(63) Continuation of application No. 12/275,628, filed on Nov. 21, 2008, now abandoned.

(60) Provisional application No. 60/989,600, filed on Nov. 21, 2007.

(51) Int. Cl.
*C08G 77/04* (2006.01)

(52) U.S. Cl.
USPC .......................................................... 525/474

(58) Field of Classification Search
USPC .......................................................... 525/474
See application file for complete search history.

(56) References Cited

U.S. PATENT DOCUMENTS

| | | | | |
|---|---|---|---|---|
| 4,129,628 | A | * | 12/1978 | Tamutus ........................ 264/2.5 |
| 4,499,149 | A | | 2/1985 | Berger |
| 4,692,379 | A | | 9/1987 | Keung et al. |
| 5,567,531 | A | | 10/1996 | Gardiner et al. |
| 6,472,077 | B1 | | 10/2002 | Cretekos et al. |
| 7,105,233 | B2 | | 9/2006 | Bechthold et al. |

FOREIGN PATENT DOCUMENTS

EP 527 286 * 2/1993

* cited by examiner

*Primary Examiner* — Kuo-Liang Peng
(74) *Attorney, Agent, or Firm* — Boyle Frederickson S.C.

(57) ABSTRACT

This invention relates to a composition and method of modifying the surface properties of polymers to produce a film or article with improved surface properties by utilizing an organo-modified polyslioxane additive. The improved surface properties for the polymer include a reduced coefficient of friction, which assists the slip and anti-blocking properties of the material, as well aiding in processing of the polymeric material. Additionally, the additive composition of this invention improves demolding and release of the polymer material from other polymeric surfaces or adhesives as well as metal molding surfaces, and allows the entire film or article formed of the polyolefin and additive to be recycled.

14 Claims, No Drawings

POLYMER COMPOSITIONS WITH IMPROVED SURFACE PROPERTIES

CROSS-REFERENCE TO RELATED APPLICATIONS

This application is a continuation of U.S. Ser. No. 12/275,628, filed Nov. 21, 2008 now abandoned, and claims priority under 35 U.S.C. §119(e) to U.S. Provisional Application Ser. No. 60/989,600, filed on Nov. 21, 2007, the entirety of which is incorporated by reference herein.

FIELD OF THE INVENTION

This invention relates to an additive for use with polymeric compositions to improve the surface properties of the composition, a polymeric composition including the additive and method of modifying the surface of the polymeric composition to produce an article with improved properties. The inventive hydrolytically stable polymeric composition including the additive shows reduced blocking, improved slip, increased lubrication, reduced coefficient of friction, improved release film properties and reduced surface energy. The additive of the present invention also improves demolding and release of the polymeric material from other polymeric surfaces, adhesives and metal molding surfaces. Additionally, the additive of the present invention provides a method for improving processing of filled or pigmented polymeric compounds.

BACKGROUND OF THE INVENTION

It is often desirable to modify the surface interface of polymeric materials to produce a variety of related surface effects such reduced surface energy, improved slip, reduced coefficient of friction, improved lubricity, reduced blocking, and to lubricate process equipment. It is also desirable to modify polymeric surfaces to improve release of adhesives and promote demolding or abhesion of other materials from metal and other polymeric composition surfaces.

Many patents utilize exotic and commercially un-desirable species of polysiloxanes as additives for thermoplastics. For example, U.S. Pat. No. 4,499,149 discloses polydiorganisiloxanes that have very polar end groups, and aromatic termination in the alpha and omega positions. This patent discloses diorgano siloxane functionalities with shorter chain di-alkyl groups having from 1 to 12 carbon atoms in length. The main focus of the '149 patent is on the end group chemistries of these compounds in order to gain compatibility of the siloxanes with polar polymers.

U.S. Pat. No. 5,567,531 also utilizes difficult to produce exotic chemistries in the terminal linkages of a polysiloxane compound to obtain improved compatibility of the compound with polymeric compositions. In particular, the pendant alkl groups on the back bone of the siloxane compound are also limited to propyl or fluorinated species. However, as a result of this structure, the siloxane materials disclosed in the '531 patent are not able to form convenient melt processable waxes with the polymeric compositions to which they are added.

U.S. Pat. No. 6,472,077 utilizes the Dow Corning MB50 additive to produce a block resistant film. This chemistry of the film is based primarily on high molecular weight dimethylpolysiloxane. However, these siloxane materials require careful and proprietary masterbatch processing technology to produce the MB50 additive. In addition many applications of this additive are sensitive to the transfer and migration ability of the MB50 additive through the polymeric composition within which the MB50 additive is incorporated, which is often highly undesirable.

U.S. Pat. No. 4,692,379 discloses the use of a polydimethylsiloxane oil to modify the coefficient of friction of polymeric films. This type of siloxane oil has been demonstrated many times to be an excellent lubricant, but suffers from severe incompatibility in many polymeric systems, and its resultant rapid migration out of the polymeric compositions within which it is utilized causes a variety of downstream processing and handling problems with the polymeric compositions including it. In addition, liquid silicone oils are very difficult to process in melt extruders.

U.S. Pat. No. 7,105,233 describes in detail the benefits and use of higher molecular weigh alkyl functional diorganofunctional siloxanes in polyolefins. However, the disclosed method of producing the long chain alkyl functionality utilizes the reaction of a long chain alcohol with hydrosiloxanes to produce a number of alkoxy bonds (Si—O—R) in the molecule. It is very well established in the art that alkoxy bonds are reactive and reversible. In particular, they are reactive in the presence of any moisture and hydrolytically cleave to produce a silanol and an alcohol leaving group. This chemistry is described in detail in the "Chemistry and Technology of Silicones" by Walter Noll. Numerous other papers are available considering the various kinetics and reversibility of this bond. In addition, the presence of acidic or basic conditions, as well as heat, can be catalytic and greatly accelerate this degradation process. Many times potentially catalytic species are used as fillers or pigments in the compounding of polymeric materials. Moisture is almost always present, often carried in by other additives combined in the polymeric composition. When the compounds including the types of additives discussed in the '233 patent are melt processed under high heat, they create the conditions conducive to the degradation of the alkoxy functional additive. Use conditions for the polymeric compositions including these additives are also often harsh and with time can also drive the degradation of the additive containing the alkoxy linkage. The resultant silicone and long chain alcohol degradation products do not provide the same surface modification benefits that the original alkyl alkoxy modified siloxane. In fact, these decomposition products are very migratory, transient and can cause process problems down stream.

Therefore, it is desirable to develop a siloxane additive for use in various polymeric compositions that provides the desired benefits to the compositions described above, but without the potential or the problems associated with the migration, degradation, and compatibility issues associated with prior art siloxane additives compounds.

SUMMARY OF THE INVENTION

It is one object of the present invention to provide a polymeric composition and method of modifying the surface of a polymeric filled or unfilled composition with a thermally and hydrolytically stable polydiorganosiloxane that does not decompose into undesirable by products capable of migrating through the polymeric composition and adversely affecting the properties of the composition. The polymeric compositions including the inventive hydrolytically stable compound and the items or films formed therefrom show reduced surface energy, reduced blocking, improved slip, increased lubrication, reduced coefficient of friction, and improved release film properties. The polymeric compositions formed with the additive compound of the present invention also have improved de-molding and release properties for the polymeric composition from other polymeric surfaces or adhesives, as well as from metal molding surfaces. Additionally, the invention provides a method for improving processing of filled or pigmented polymeric compounds and can be utilized to produce a ready-to-use release liner. The additive compound is formed as a polydiorganosiloxane molecule that does not have any alkoxy bonds at the terminal groups of the molecule. This provides the molecule with the required stability to provide the benefits associated with the siloxane additive, but without the capacity for degradation of the molecule resulting from reactions occurring at an alkoxy bond, as in prior art additive compounds.

It is a further object of this invention to provide a polymeric composition formed with the additive compound to produce these improved surface properties that can be comprised of polyolefin polymers and non-olefinic polymers.

It is another object of this invention to provide an improved process aid or additive for use in conjunction with polymeric compounds.

It is still a further object of this invention to provide a polymeric composition formed with the thermally and hydrolytically stable polydiorganosiloxane additive to provide polymeric compositions that have the desired properties, but that also have improved recyclability, in that the items or films formed from the polymer and the additive can be fully recycled.

Numerous other objects, features and advantages of the present invention will be made apparent from the following detailed description, taken together with the claims.

DETAILED DESCRIPTION OF THE INVENTION

The composition of the invention is a thermoplastic polymer or a thermoset resin based composition containing at least one hydrolytically and thermally stable, melt processable organo-modified polysiloxane additive that is substantially non-migratory, and that modifies the surface of a polymeric composition so the composition has reduced surface energy, reduced blocking, improved slip, increased lubrication, reduced coefficient of friction and improved release film properties. The additive compound of the invention also improves demolding and release of the polymeric material from other polymeric surfaces, adhesives and metal molding surfaces. Additionally, the invention provides a method for improving processing of filled or pigmented polymeric compounds through the use of the hydrolytically and thermally stable, melt processable organo-modified polysiloxane additive compound.

Thermoplastic polymers that can be utilized in this composition are primarily polyolfins such as polypropylene and polyethylene. Without limitation, other engineering resins such as nylon, polyetheretherketone (PEEK), ethylene vinyl acetate (EVA), styrenics, styrene acrylonitrile (SAN), polyester terepthalate (PET) as well as thermoplastic elastomers, TPUs, plastomers, and TPVs can also be utilized in this composition. In addition, the polymers utilized to form the composition can be comprised of polyolefin polymers and non-olefinic polymers. No limitation is anticipated in the selection of thermoplastic, thermoset or polymeric resins which can be useful in the manufacture of compositions according to in this invention.

The polymeric composition including the hydrolytically and thermally stable, melt processable organo-modified polysiloxane additive of this invention may contain one or more additives commonly known in the art without interference with the performance of the additive of this invention. Fillers such as calcium carbonate, talc, magnesium dihydroxide, aluminum trihydrate, amine based flame retardants, borates, titanium dioxide as well as organic and inorganic pigments are all compatible with the inventive polydiorganosiloxane of this invention. In fact, the invention demonstrates improved dispersion and processing of these filled systems.

Other additives such as stabilizers, other process aids, anti-blocks, specialty pigments or other reactive and non-reactive additives are compatible with the inventive additive due to the inert nature and stability of the inventive polydiorganosiloxane additive.

The polydiorganosiloxane additive of this invention is very thermally stable during processing and use, as compared to ethoxylated and alkoxylkated siloxane species due to the direct silicone to carbon bonds within the siloxane additive molecule. As a result, higher processing temperatures such as those required for engineering resins may be used with the inventive composition.

The polydiorganosiloxane additive of this invention produces highly concentrated domains within the polymeric matrix when compounded into various polymers. The polydiorganosiloxane additive will also form high concentration domains surrounding pigment and filler particles and interfaces with air, metal or other polymers. In the processing melt phase of the polymeric compound, the polydiorganosiloxane additive is quite surface active and will migrate to the interfaces described above. However, the polydiorganosiloxane additive is a solid at traditional use temperatures under 150° F. and is considered substantially non-migratory. The high molecular weight and molecular morphology of the polydiorganosiloxane additive also contribute to the non-migratory nature of the additive. This non-migratory nature and low-transferability from the polymeric compound is a highly desirable feature of the polydiorganosiloxane additive of this invention.

Another desirable attribute of the polydiorganosiloxane additive of this invention is the improved ability to recycle the various items, such as release films, produced using polymeric compositions including the polydiorganosiloxane additive. Prior art silicone coated release films are difficult to melt reprocess because the cured silicone is incompatible with the polymer. However, the polymeric compositions formed including the polydiorganosiloxane additive of this invention are remeltable, remixable and thermally stable during reprocessing. In accordance with the present invention, a thermoplastic or thermoset resin is compounded with at least one diorgano-modified siloxane compound that is melt processable and has limited migration ability at end use temperatures, T<150° F. for example. The organo-modified compound, wherein the polysiloxane comprises repeating units, has the following general structure:

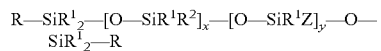

wherein x is greater than 15, y=0-50, preferably <20, and more preferably 0, Z is a radical with the structure —[O—SiR$^1$R$^2$]$_n$—O—SiR$^1$$_2$—R, n=0-50, preferably <10, and more preferably 0, R is a hydroxyl or methyl radical, R$^1$ is methyl radical and R$^2$ is either a methyl radical or a C12-C75 saturated or unsaturated, hydrocarbon radical. When formed of the C12-C75 radical, R$^2$ can be linear or branched. Commercially available alpha olefins used to make the additive statistically contain at least some branched molecules either by intention or as an impurity and while linear R$^2$ groups are preferred, branched R$^2$ groups do not negatively affect the performance of the additive. Alternatively up to 90% of the R$^2$ radicals are formed of methyl styrene or other aryl groups.

These aryl and methyl styrene groups improve the thermal stability of the molecule due to the presence of the conjugated ring.

The additive of this invention is produced from direct hydrosilylation of alpha olefins with siloxanes containing silanic hydrogen. Any one of a number of common catalysts can be used to produce equivalent products. The Si—C bond that it produces is hydrolytically and thermally stable and provides the advantages outlined in this invention. The alpha olefins used in the preparation of the additive are produced from specific sources with specific processes that produce olefins that necessarily have a statistical distribution of chain lengths with corresponding averages, characteristic chain length and branching distributions. The description of the invention encompasses and addresses these ranges of molecular weights and branching. The inventive additive will then necessarily have a carbon number range of C12 to C75 with an average carbon number that can vary depending on the particular source and particular process used to produce the alpha olefin used in the formation of the additive. The amount and morphology of the branching present is also a distinguishing attribute to a specific source of alpha olefin based on the particular processes and materials used by that source. The inventive additive can be produced with a single alpha olefin source or a blend of alpha olefins from different sources, resulting in a composition with various molecular weights and morphologies.

The chain length or Dp (degree of polymerization) formed or represented by the siloxane unit (—[$SiR_2O$]$_x$—) of the siloxane polymer has a minor effect on ultimate performance. The preferred embodiment of this invention has a value of x, or a Dp of between 15 and 2000. The siloxane portion of the additive can be either linear or branched, or a blend thereof. The preferred embodiment of the additive contains a liner siloxane backbone structure. However, statistically in most commercial products, there exists some branching. Therefore, to accommodate the ability to use siloxanes with branching present because branched structures do not negatively affect the function of the additive, the present invention encompasses the formation and use of additives of the above-recited general structure that are either linear or branched.

The number of $R^2$ units with a molecular weight or size greater than methyl in the C12 to C75 range is an important factor contributing to performance. In particular, this controls the compatibility, and thus the dispersion and migration ability for these siloxane additives. In the preferred embodiment of this invention at least 10% and more preferably at least 75% of the siloxane units present in the additive compound are not di-methyl siloxanes. The amount of branching, structure and molecular weight of the $R^2$ hydrocarbon group is very important to the performance of the additive and controls the melt point and significantly influences the migration ability of the siloxane additives. The $R^2$ group must either be of sufficient molecular weight, i.e., C12 or higher, to make it a solid or wax at post processing use temperatures, such as <150° C., or have other structural elements thereon that significantly retard migration of the molecule after processing. The $R^2$ group structure must also allow for the additive to be melt processable or at least able to melt at normal compounding and production temperatures. The non-methyl $R^2$ groups present in the additive compound may be, but are not necessarily limited to, alkyl groups of C12 or higher, branched alkyl, unsaturated alkyls, aryl or styrenic, alkoxylates and the like. Blends of these functional groups on the molecule are instrumental in developing improved compatibility and optimizing the additive for a particular compound.

The currently preferred embodiment of the invention is a polymer or resin combined with 0.01 to 10 parts by weight of at least one organo-modified siloxane compound of the formula:

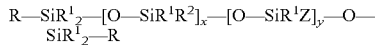

where Z is a radical with the structure —[O—$SiR^1R^2$]$_n$—O—$SiR^1_2$—R, y=0, n=0, x is greater than 35 and at least 50% of the $R^2$ groups are non-dimethyl groups, e.g., alkyl C16 to C75 groups, either independently or a blend thereof.

In further accordance with the present invention, the hydrocarbon radical $R^2$ is covalently bonded directly to the silicon atom of the back bone of the additive molecule to produce a thermally and hydrolytically stable bond that will not decompose during processing or use into undesirable by-products.

In further accordance with the present invention the thermoplastic compound may be made into a film by cast extrusion, blown, it may be extruded into a profile or molded into an article. In still further accordance with the present invention the thermoplastic composition can optionally contain other performance additives such as antioxidants, pigments, fillers, additional lubricants, impact modifiers and other additives traditional incorporated into thermoplastic compositions for performance.

Potential Applications

One important application for the inventive polymeric compositions is in films produced by the blown film process, extruded films or co-extruded films. Some specific potential applications of such films are films to be used for release liners, films for packaging, films for agricultural or greenhouse use, co-extruded films and graphics films. These products benefit greatly from the improved lubricity, reduced coefficient of friction, improved slip and reduced blocking provided by the polydiorganosiloxane additive incorporated into the polymeric compositions.

Films produced from the inventive polymeric compositions can produce ready to use release liners useful for backing of adhesives, carriers for adhesive materials, tapes, labels, masking or any application where films traditionally coated with cured silicones are used.

Injection molded parts and profile extrusions formed from the polymeric compositions including polydiorganosiloxane additive can also benefit from the enhanced reduced surface friction and release properties provided by the additive of the present invention.

Blow molded parts can benefit from the increased surface lubricity imparted by the polymeric compositions including polydiorganosiloxane additive in the inventive compositions. Bottles and other parts are easier to handle in bulk and can pack more efficiently in totes and boxes, and less marring of the items occurs with the reduction of the COF. Further, bottle caps and other closures are also easier to remove and operate with the improved surface lubricity provided by the polymeric compositions of the present invention. This inventive composition is also utilizable in rotomolding applications to assist in demolding. Further, the enhanced lubricity and high thermal stability of the inventive compound are useful in applications of high wear and friction such as gaskets, bearings and bushings.

The surface active nature during the melt process phase and the lubricity the additive provides is additionally useful in the processing of polymeric composition where fillers and pigments are dispersed in a polymeric matrix. Reduced torque, reduced energy input and more efficient dispersion are observed when the polydiorganosiloxne of this invention are used in the polymeric compositions.

Also, thermoset applications requiring heated mixing or curing are excellent candidates for the inventive additives disclosed here. The temperature during processing must be sufficient to liquefy the additive and disperse it throughout the compound. If this is performed the surface properties and release behavior will be improved.

In addition, due to the thermal and hydrolytic stability of the additive within the polymer, the items and films formed using the additive can be fully recycled because the additive remains stable during the recycling process.

EXAMPLES

The following examples are provided for reference and are not intended to limit the application of the inventive composition.

Silicone A is an example of the additive of the present invention produced by standard hydrosilation utilizing a platinum catalyst, (for a review of hydrosilylation techniques refer to "Comprehensive Handbook on Hydrosylation" by B. Marciniec.) of a commercial methyl hydrogen siloxane fluid with an average Dp between 30 and 50, and >75% of the siloxane units having a silanic hydrogen with a 10% stoichiometric access to the silanic hydrogen of a commercially available alpha olefin that is a blend of liner and branched olefin groups ranging from C22 to C75. The resultant organo-modified siloxane wax has an average melt point of 160° F.

Silicone B is commercially available ultra high molecular weight silicone additive (Genioplast P) produced by Wacker Chemie and is known in the art as a process aid and surface lubricant.

Silicone C is an example of the additive of the present invention produced in the same manner as Silicone A with the alkyl substituted with a blend of a broader distribution of alkyl groups ranging from C18 to C75. The resultant organo-modified sloxane wax has an average melt point of 107° F.

Silicone D is an example of the additive of the present invention produced in the same manner as Silicone A with the alkyl substituted with a combination of alpha methyl styrene and alpha olefin with alkyl groups ranging from C22 to C75. The resultant siloxane wax has an average melt point of 150° F.

Silicone E is Dow Corning MB50-001.

Example of Use as Process Aid

These compounded materials were produced with a 0.65 MI/0.904 Density Homo-polymer Polypropylene using a Haake Torque Rheometer with 20:1 L/D Bradender twin screw counter rotating extruder with 4 temperature segments. At an RM ranging from 30 to 50 and a temperature profile of between 375 and 475 degrees F.

Films were produced using a 25:1 L/D Brabender single screw with a blown film die. The extruded blown film was collected on a vertical blown film tower. During extrusion the torque values were measured at 30 rpm to observe any process aid attributes resulting from the increased lubricity. The results in Table 1 show that the inventive compounds process as well as silicones promoters as a process aid.

TABLE 1

| | % Additive | Additive | Torque |
|---|---|---|---|
| 1 | 0.0% | Control | 30.00 |
| 2 | 5.0% | Silicone B | 12.00 |
| 4 | 2.0% | Silicone A | 9.60 |
| 5 | 4.0% | Silicone A | 1.40 |

Example of Reduced Static COF

Static coefficient of friction measurements were performed film on film with an increasing angle arm device. The test specimens approximately 1"×4" are attached to the aluminum lever arm and a 150 g steel block with a face dimension of 1'×2". The arm raises until the block begins to move. The angle of the arm is measured when the blocks slides and in converted to COF by the calculating the tangent of the angle. The results are disclosed in Table 2 and demonstrate that the silicones of this invention can reduce the COF as much or more than commercial silicones used for this purpose.

TABLE 2

| | % Additive | Additive | COF |
|---|---|---|---|
| 1 | 0.0% | Control | 0.42 |
| 2 | 5.0% | Silicone B | 0.34 |
| 4 | 2.0% | Silicone A | 0.34 |
| 5 | 4.0% | Silicone A | 0.29 |

Example of Improved Demolding

Demolding was evaluated by placing compounded pellets from the above blown film example into aluminum mold dishes and heated for 2 hours at 210° C. so the pellets melted and coalesced. The molds were cooled to room temperature and the molded puck was removed from the mold. The difficulty of removal was given a scale from 1 to 10 where 1 is given when the puck falls out of the mold with no force and 10 being fused to the mold and destruction of the puck would be necessary. The scale in between is the approximate force required to separate the puck from the mold. The clarity of the puck was observed as well. The control material in highly translucent and that was given a 1 rating, and 2 indicates a significant increase in haze, and 3 is opaque. These results are provided in Table 3.

It can be seen that the use of the siloxane additives of this invention have a dramatic impact on demolding over the control. The results also show that the siloxanes do not dramatically hurt the haze as much as other demolding additives. Silicone C was comparable to Silicone B in performance at a lower level and had better clarity. It is also observed in trial 3 and 4 that the siloxanes can be synergistic when used in conjunction with other additives. Trial 3 was blended with a phosphate ester which is also a synergist.

TABLE 3

| | Release Additive | Adhesion Rating | Clarity Rating |
|---|---|---|---|
| 1 | Control | 9.5 | 1 |
| 2 | 5% Silicone C | 3.5 | 1 |
| 3 | 4% Silicone C, 1% PE | 1 | 1 |
| 4 | 5% Silicone B, 1% Silicone A | 1.5 | 2 |
| 5 | 10% Silicone B | 2 | 3 |

Example of Ready to Use Release Liner Film

Abhesive properties or release was measured by testing the blown films produced under TLMI 180 peel test procedures using TESA tape 7475 pulled at 300 inches per minute. The tape laminated samples were conditioned at 140° F. for 20 hours before peeling.

Table 4 demonstrates that the inventive composition can act as a melt additive release agent to produce ready to use release liner films. The control was welded to the tape and could not be removed. Silicone A showed improved release to silicone B which is a melt additive intended to perform the same function.

TABLE 4

|   | % Additive | Additive | 300 ipm Release (g) |
|---|---|---|---|
| 1 | 0.0% | Control | Welded |
| 2 | 10.0% | Silicone C | 375.00 |
| 3 | 4.0% | Silicone A | 161.00 |

Example of Kinetic COF Reduction

In this example, the kinetic coefficient of friction modification of the invention was demonstrated with a thermoplastic elastomer or plastomer. The polymer Dow Chemical Affinity PL1880G was melt processed in a twin screw extruder with 3.0% of Silicone A, B, C and E. The resultant compound was made into a 5 mil film via blown film processing. The films were measured for kinetic coefficient of friction on a Instumentors 3M90 Slip/Peel testing apparatus following ASTM D-1894 specifications as closely as possible, and the results are shown below in Table 5.

TABLE 5

|   | Kinetic COF |
|---|---|
| No Additive | 0.53 |
| Silicone A | 0.2 |
| Silicone B | 0.17 |
| Silicone C | 0.35 |
| Silicone E | 0.22 |

Both inventive silicones A and C show a drop in kinetic COF approaching that of commercial pure dimethyl siloxane polymers B and E.

Example of Aluminum Mold Release in Polystyrene

For this example 3% of Silicone A was melt blended at 210 C into a crystalline polystyrene grade 1200 from Ineos Nova Chemical (density of 1.0 and MFI of 1.6 g/10 min) in a Brabender mixing bowl with a sigma blade configuration. The compound was then placed in an aluminum pan mold and heated to 210 C in an oven for 15 minutes. The mold was cooled to room temperature an adhesion to the mold was evaluated with a the same scale as in the previous example. The results show an improvement in release from the aluminum mold and demonstrates the additives utility in non-olefinic polymers.

TABLE 6

|   | Adhesion Rating |
|---|---|
| No Additive | 3 |
| Silicone A | 1 |

Increased Contact Angle in PolyCyclo-Olefin

Silicone A, C and D were compounded at 3% into a polycyclo-olefin polymer with a density of 1.01, MFR of 60 g/10 min and a Tg of 100 C. These were molded into plaques and DI water contact angle measured with a goniometer. The results in table 7 show a dramatic increase in contact angle showing that there is significant siloxane on the polymer surface to effect surface properties.

TABLE 7

|   | Contact Angle |
|---|---|
| No Additive | 97 |
| Silicone A | 99.4 |
| Silicone C | 101 |
| Silicone D | 99.1 |

Example of Improved Processing of Fillers

Silicone A was compounded with granular Fortiline Polypropylene H12F-00 by Ineos and calcium carbonate. Silicone A was compounded in a Brabender sigma blade mixing bowl on a Haake 90 torque rheometer at 180° C. with Carbitol 110 untreated calcium carbonate at 1 and 3%. This was compared to the same formulation using Carbitol 110S stearic acid treated calcium carbonate to see if it performs as a filler dispersing aid and process aid. The total torque put into the system, the final torque level required for mixing and the final temperature were measured after 7 minutes of melt mixing. The results in Table 8 demonstrate that Silicone A can be very effective as a dispersing aid for calcium carbonate. It also shows that the use of as little as 1% Silicone A as a process aid would allow the compounder to use untreated calcium carbonate and potentially save raw material costs.

TABLE 8

|   | 110 | 110S | Silicone A | PP | Final Temp C. | Final Torque nm | Total Torque nm |
|---|---|---|---|---|---|---|---|
| Composition 1 |  | 40% |  | 60% | 192 | 2.5 | 36 |
| Composition 2 | 40% |  | 1% | 59% | 193 | 2.5 | 34.5 |
| Composition 3 | 40% |  | 3% | 57% | 192 | 2 | 34 |

Various other alternatives are contemplated is being within the scope of the following claims particularly pointing out and distinctly claiming the subject matter regarded as the invention.

I claim:

1. A polymer composition having improved surface properties, the composition comprising:
   a) a thermoset resin polymer; and
   b) at least one melt processable, organo-modified siloxane additive capable of reducing the COF of the polymer composition of the formula:

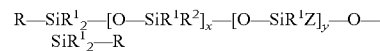

in which
   Z is a radical with the structure —[O—SiR$^1$R$^2$]$_n$—O—SiR$^1{}_2$—R
   R is a hydroxyl or methyl radical;
   R$^1$ is a methyl radical;
   R$^2$ is selected from the group consisting of a C1 or a C12-C75 saturated or unsaturated, hydrocarbon radical;
   x is greater than 15;
   y is 0-50; and
   n is 0-50
   wherein at least 10% of the siloxane units present in the additive compound are not di-methyl siloxanes, and wherein the remainder of the siloxane units are di-methyl siloxanes.

2. The polymer composition of claim 1 wherein at least 75% of the siloxane units present in the additive compound are not di-methyl siloxanes.

3. The polymer composition of claim 1 wherein the additive is present in an amount of between about 0.01 to about 10 parts by weight of the composition.

4. The polymer composition of claim 1 wherein x is greater than 35 and at least 50% of the $R^2$ groups are alkyl groups of C16 to C75.

5. The polymer composition of claim 1 wherein the improved surface properties are selected from the group consisting of: a coefficient of friction, slip properties, blocking properties, demolding capability, release properties, and combinations thereof.

6. The polymer composition of claim 1 wherein the polymer is filled or unfilled.

7. The polymer composition of claim 1 wherein the non-methyl R2 groups are C18-C75 saturated or unsaturated, hydrocarbon radicals.

8. The polymer composition of claim 1 wherein the non-methyl R2 groups are C22-C75 saturated or unsaturated, hydrocarbon radicals.

9. The polymer composition of claim 1 wherein the composition is fully recyclable.

10. The polymer composition of claim 1 wherein the composition is formed into a release liner.

11. A method for improving the surface properties of a polymer composition formed of a thermoset resin polymer which comprises adding to the polymer between about 0.01 to about 10 parts by weight of the composition of an additive of the formula:

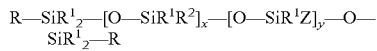

in which

Z is a radical with the structure —[O—SiR$^1$R$^2$]$_n$—O—SiR$^1{}_2$—R

R is a hydroxyl or methyl radical;

R$^1$ is a methyl radical;

R$^2$ is selected from the group consisting of a C1 or a C12-C75 saturated hydrocarbon radical;

x is greater than 15;

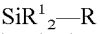

y is 0-50; and n is 0-50 wherein at least 10% of the siloxane units present in the additive compound are not di-methyl siloxanes, and wherein the remainder of the siloxane units are di-methyl siloxanes.

12. The method of claim 11 wherein the surface properties are coefficient of friction, release properties, demolding properties, blocking properties and slip properties.

13. The method of claim 11 wherein the additive present in the polymer compound improves the filler and pigment dispersion resulting in improved processing and improved physical properties of the compound.

14. A polymer composition having improved surface properties, the composition comprising:

a) a thermoset resin polymer; and b) at least one melt processable, organo-modified siloxane additive capable of reducing the COF of the polymer composition of the formula:

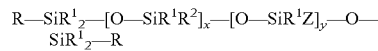

in which

Z is a radical with the structure —[O—SiR$^1$R$^2$]$_n$—O—SiR$^1{}_2$—R

R is a hydroxyl or methyl radical;

R$^1$ is a hydroxyl or methyl radical;

R$^2$ is selected from the group consisting of a C1, an alkoxylate or a C12-C75 saturated or unsaturated, hydrocarbon radical; and x is greater than 15;

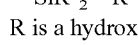

y is 0-50 n is 0-50 wherein at least 10% of the siloxane units present in the additive compound are not di-methyl siloxanes, and wherein the remainder of the siloxane units are di-methyl siloxanes, and wherein if R$^2$ is an alkoxylate the percent of non-dimethyl siloxane groups that contain the alkoxylate is between 5 to 75%.

* * * * *

UNITED STATES PATENT AND TRADEMARK OFFICE
CERTIFICATE OF CORRECTION

PATENT NO. : 8,541,515 B1  
APPLICATION NO. : 12/416635  
DATED : September 24, 2013  
INVENTOR(S) : Daniel T. Berg Page 1 of 1

It is certified that error appears in the above-identified patent and that said Letters Patent is hereby corrected as shown below:

On the Title Page, Item (73) Assignee: Please delete "Whitewater" and substitute therefor
-- Wauwatosa --.

Signed and Sealed this
Twelfth Day of August, 2014

Michelle K. Lee
*Deputy Director of the United States Patent and Trademark Office*